(12) United States Patent
Yuan et al.

(10) Patent No.: US 7,388,833 B2
(45) Date of Patent: Jun. 17, 2008

(54) ACCESS CONTROL AND PROTOCOL FOR PACKET SWITCHED WIRELESS COMMUNICATIONS NETWORKS

(75) Inventors: Yuan Yuan, Greenbelt City, MD (US);
Daqing Gu, Burlington, MA (US);
Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 904 days.

(21) Appl. No.: 10/861,258

(22) Filed: Jun. 4, 2004

(65) Prior Publication Data

US 2005/0271019 A1    Dec. 8, 2005

(51) Int. Cl.
*H04L 1/00* (2006.01)
(52) U.S. Cl. .................... 370/230.1; 370/349
(58) Field of Classification Search ............. 370/230.1, 370/349, 471, 313, 332, 231–235, 252–253
See application file for complete search history.

(56) References Cited

U.S. PATENT DOCUMENTS

2004/0105386 A1* 6/2004 Sipola .................. 370/230.1
2005/0180444 A1* 8/2005 Gu et al. ................... 370/412

OTHER PUBLICATIONS

Y. Xiao, "MAC performance analysis and enhancement over 100mbps data rates for IEEE 802.11" Vehicular Technology Conference, Oct. 6, 2003, pp. 1869-1873.

J. Khan, "An ARQ Scheme for Packet Transmission in a Wireless Network Using a Block Reservation Protocol," Vehicular Technology Conference, Proceedings, Oct. 7, 2001, vol. 1, pp. 1138-1142.

S. Borst and P. Whiting. Dynamic rate control algorithms for HDR throughput optimization. In Proceedings of IEEE INFOCOM '01, Anchorage, Alaska, Apr. 2001.

G. Holland, N. Vaidya, and P. Bahl. A rate-adaptive MAC protocol for multi-hop wireless networks. In Proceedings of ACM MOBICOM'01, Rome, Italy,2001.

N. Vaidya, P. Bahl, and S. Gupta. Distributed fair scheduling in a wireless LAN. In Proceedings of ACM MOBICOM'00, Boston, MA, Aug. 2000.

Sadeghi, V. Kanodia, A. Sabharwal, and E. Knightly, "Opportunistic media access for multirate ad hoc networks," in Proceedings of ACM MOBICOM '02, Sep. 2002.

G. Bianchi. Performance analysis of the IEEE 802.11 distributed coordination function. IEEE Journal on Selected Areas in Communications, Mar. 2000.

Martin Heusse, Franck Rousseau, Gilles Berger-Sabbatel, Performance Anomaly of 802.11b IEEE Infocom 2003, Mar. 2003.

(Continued)

*Primary Examiner*—Tu Nguyen
(74) *Attorney, Agent, or Firm*—Dirk Brinkman; Clifton D. Mueller; Gene V. Vinokur

(57) ABSTRACT

A method transmits packets over a single channel in a wireless communication network that includes multiple nodes. Access to the channel is gained in a transmitting node. Then, a block of packets is transmitted to a receiving node via the channel. The transmitting node receives only a single acknowledgement packet from the receiving node in response to transmitting the block of packets.

14 Claims, 5 Drawing Sheets

OTHER PUBLICATIONS

G. Cantieni, Q.Ni, C.Barakat, and T.Turletti, Performance Analysis of Finite Load Sources in 802.11b Multirate Environments, INRIA Research Report, Jul. 2003.

Q.Ni, L. Rimdlamni, T.Turletti and L.Aad, "QoS issues and Enhancement for IEEE 802.11 Wireless LAN", INRIA Research Report, 2002.

S. McCanne and V. Jacobson, "vic, a flexible framework for packet video", ACM Multimedia, 1995.

G.J. Foschini and M.J. Gans, On Limits of Wireless Communications in a Fading Environment when Using Multiple Antennas, Lucent Technologies, Bell Labs Holmdel.

Emre Telatar, Capacity of Multi-antenna Gaussian Channels, European Transactions on Telecommunications, vol. 10, No. 6, pp. 585-595, Nov./Dec. 1999.

http://www.intel.com/update/contents/wi07032.htm#top, Intel Working to Make Ultra Wideband Technology a Reality.

* cited by examiner

300

400

500

ACCESS CONTROL AND PROTOCOL FOR PACKET SWITCHED WIRELESS COMMUNICATIONS NETWORKS

FIELD OF THE INVENTION

This invention relates generally to communication systems, and more particularly to medium access control for packet-switched wireless networks.

BACKGROUND OF THE INVENTION

In wireless communication networks, common topologies are a 'star' network operating in infrastructure mode and a 'cluster' network operating in ad hoc mode. In a star network, all nodes, e.g., mobile terminals, communicate packets indirectly with each other via a central node called a coordinator or access point (AP), e.g., a base station. The AP receives packets from transmitting nodes and forwards the packets to receiving nodes. In a cluster network, all terminals communicate packets directly with each other.

The operation of such networks can be according to the IEEE 802.15.3 and IEEE 802.15.4 standards, see "IEEE Standard for Information technology—Telecommunications and information exchange between systems—Local and metropolitan area networks: *Specific requirements Part 15.3: Wireless Medium Access Control (MAC) and Physical Layer (PHY) Specifications for High Rate Wireless Personal Area Networks (WPANs)*," 2003, and IEEE Standard for Information technology—Telecommunications and information exchange between systems—Local and metropolitan area networks—"*Specific requirements Part 15.4: Wireless Medium Access Control (MAC) and Physical Layer (PHY) Specifications for High Rate Wireless Personal Area Networks (WPANs)*," 2003.

Because the signals transmitted by all nodes share the same frequency band, it is necessary to enforce a channel access methodology in order to efficiently utilize the network bandwidth. This can be done with a channel access schedule, which determines when and how terminals can access the channel. The access schedule can be broadcast periodically using a beacon frame.

The beacon specifies network parameters, i.e., transmission rates, logical channels, network identifiers, and the channel access schedule. The period between successive beacon signals is called a frame. The beacon is followed by a contention period and a contention free period. The beacon frame defines the start of the contention period, the start of the contention free period, and the access schedule for the contention free period.

During the contention period, the terminals compete with each other to gain access to the physical channel. Typically, a random access method such as Aloha or CSMA is used. After gaining access, terminals transmit packets on the channel strictly according to the access schedule during the contention free period to guarantee interference free packet transmissions.

Recent advances in wireless communications, such as smart antennas, digital signal processing and VLSI, make it possible to provide very high-capacity wireless channels in the physical medium layer. These emerging physical-layer technologies offer at least an order-of-magnitude larger bandwidth than the bandwidths used by current generation standards.

For example, the IEEE 802.11n standard for a physical layer specification provides up to 100 Mb/s throughput at the medium access control (MAC) layer. The IEEE 802.15.3a standard for high-capacity wireless personal area networks aims at data rates of 110 Mb/s or higher using ultra-wideband (UWB) communications.

CSMA/CA Media Access Control

Wireless networks, based on the IEEE 802.11 standard, use a distributed coordination function (DCF) to control access to the physical channel. The DCF applies to both infrastructure and ad-hoc modes and can follow the well-known CSMA/CA medium access control (MAC).

Before each packet is transmitted, a node senses the channel, waits until the channel becomes idle, and then defers for a time interval called a DCF inter-frame space (DIFS). Then, the node enters a backoff stage and determines a random time interval called the backoff-time. The random time interval is uniformly distributed between zero and a size of a contention window (CW). After the backoff-time expires, an optional Request to Send/Clear to Send (RTS/CTS) is initiated between the two communicating nodes. After successful RTS/CTS, only one data packet is transmitted over the channel. If the packet is received correctly, the receiving node transmits an acknowledgement packet (ACK) for the single transmitted packet, unless the packet was broadcast to all nodes. If an ACK packet is not received, the packet is retransmitted, until it is correctly received.

To reduce the probability of collisions, the size of the CW is doubled after each perceived collision until a maximum value, CWmax, is reached. The size of the CW is reset to a fixed minimum value, CWmin, after a successful transmission of a packet to maintain channel efficiency.

The MAC for the IEEE 802.11e standard provides quality-of-service (QoS) for multiple contending nodes. The standard defines a hybrid coordination function (HCF), which combines DCF and point coordinated function (PCF) with enhanced QoS mechanisms. The contention based channel access mechanism in HCF is called an enhanced distributed channel access (EDCA). This provides fully distributed, differential channel access.

As shown in FIG. 1, a virtual collision handler 120 for EDCA uses four access categories (ACs) 100-103. Each of the ACs can be considered as an instance of the DCF described above. To achieve different channel access priorities, ACs are configured with different value of DIFS, now called arbitration IFS (AIFS) 110, CWmin and CWmax. Moreover, the access point can dynamically adjust these parameters by setting new values in the appropriate fields of the periodic beacons. Within the four ACs, AC0 and AC1 are typically employed for carrying best effort and background traffic at relatively low data rates, video streams use AC2, and audio streams use AC3 to attain a highest priority delivery at relatively high data rates.

Limitations of Current CSMA/CA MAC

The current 802.11 MAC is inefficient for a high-capacity physical layer. FIG. 2 illustrates the MAC-layer throughput achieved by DCF when the physical layer nominal bit rate is 216 Mb/s. As shown by curve 201, the current DCF MAC can only deliver about 48 Mb/s throughput when RTS/CTS is disabled, and curve 202 shows that a mere 30 Mb/s of throughput when the RTS/CTS is enabled. This is far below the target rate of 100 Mb/s at the MAC-layer, as specified by the IEEE 802.11n MAC standard.

The fundamental problem is that current MAC according to the IEEE 802.11 standard is rather inefficient, causing a significant reduction in bandwidth. The inefficiencies are due to excessive overhead for the RTS/CTS, packet preambles, acknowledgements, contention windows and various interframe-spacing parameters. The overhead becomes even more significant as the data rate increases. This is because the relative portion of channel time actually carrying data decreases, while the overhead remains constant. The packet preambles and various interframe spacing are fixed parameters determined by specific designs of the physical layer.

Hence, it is an object of the invention to reduce this overhead.

The current CSMA/CA based design cannot exploit the multi-rate capability to increase the overall channel utilization. The DCF MAC ensures roughly the same long-term access probability, hence throughput fairness, for each node, no matter the transmit rate used by the node. As a result, the channel is unnecessarily monopolized by low-rate nodes in terms of channel access time. The high-rate nodes only utilize a disproportionately lower amount of access time. This leads to sub-optimal overall channel throughput. As a byproduct, this also results in completely unfair time allocation for nodes with different transmission rates. The unfairness especially penalizes the throughput of the high-rate nodes and largely cancels out the high capacity offered at the physical layer.

Hence, it also an object of the invention to fully exploit multi-rate capabilities.

Communication-intensive applications, such as video and audio streams, are made possible by the new physical layer. These applications typically require quality-of-service (QoS) assurances in terms of minimum delay and/or minimum bandwidth, in order to function properly. However, current MAC solutions do not provide any performance bounds.

Hence, it also an object of the invention to support service differentiation among diverse applications to assure QoS statistically within a single MAC.

SUMMARY OF THE INVENTION

The invention provides an adaptive distributed channel access (ADCA) method that works with a high-capacity physical layer to greatly improve channel efficiency and quality-of-service (QoS).

The ADCA according to the invention exploits adaptive batch transmission of packets and opportunistic selection of high-rate nodes to reduce overhead and improve aggregate throughput in a wireless channel.

The invention also provides both high-rate nodes and low-rate nodes with proportional temporal fairness, in the long term.

DETAILED DESCRIPTION OF THE PREFERRED EMBODIMENT

Figure 5:
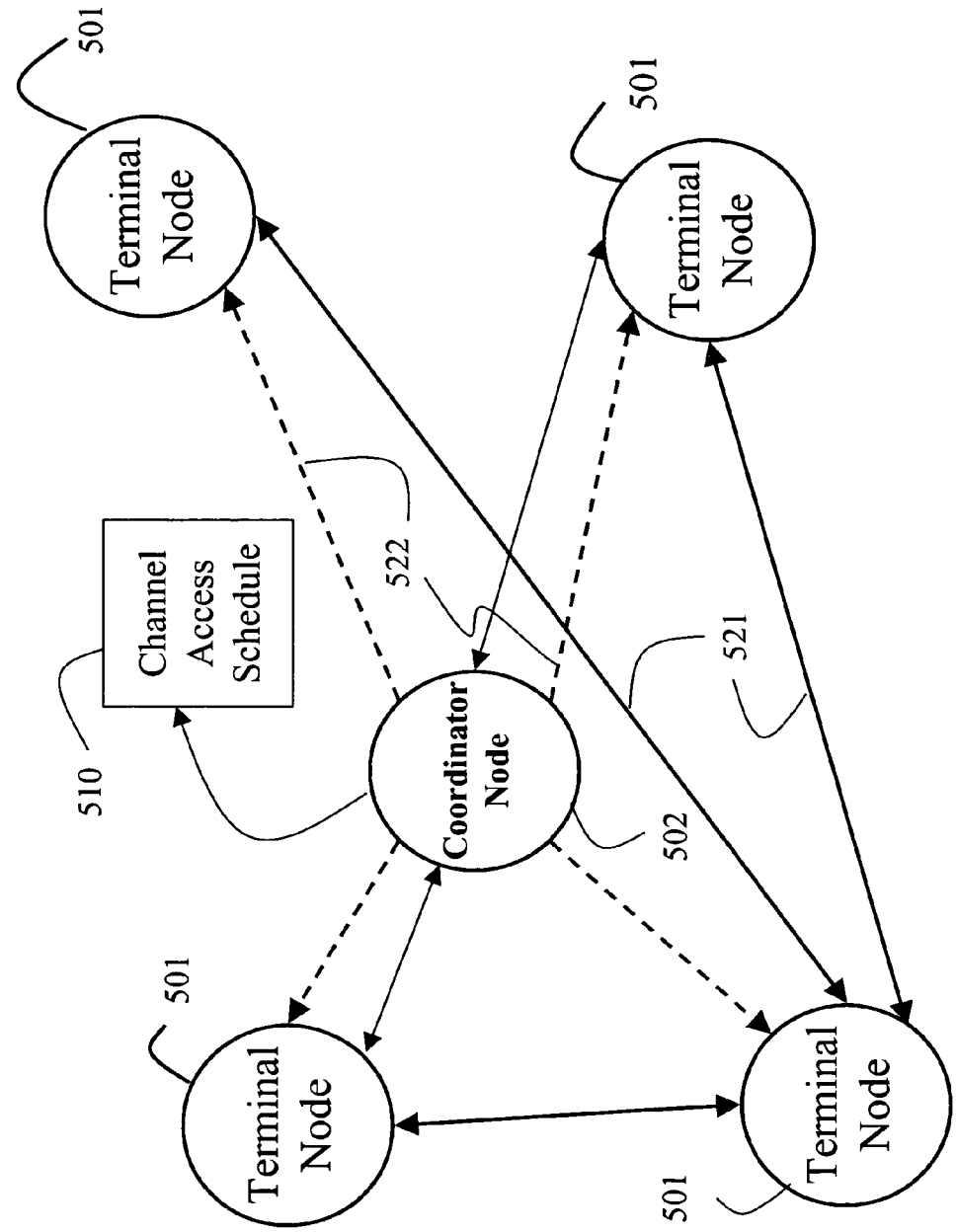
FIG. 5 is a block diagram of a network that uses the invention.

As shown in FIG. 5, a packet switched communication network 500 according to the invention includes multiple terminal nodes 501 and a coordinator node or access point (AP) 502. The transmitted packets of all of the nodes 501 and the AP 502 share the same frequency band. The terminals exchange packets 521. The exchange can be direct between nodes, and indirect via the coordinator node or AP.

The coordinator node as described below determines a channel access schedule 510. The access schedule determines when and how terminals can access the channel. The access schedule is broadcast by the coordinator using a beacon frame 522, described in greater detail below.

Figure 4:
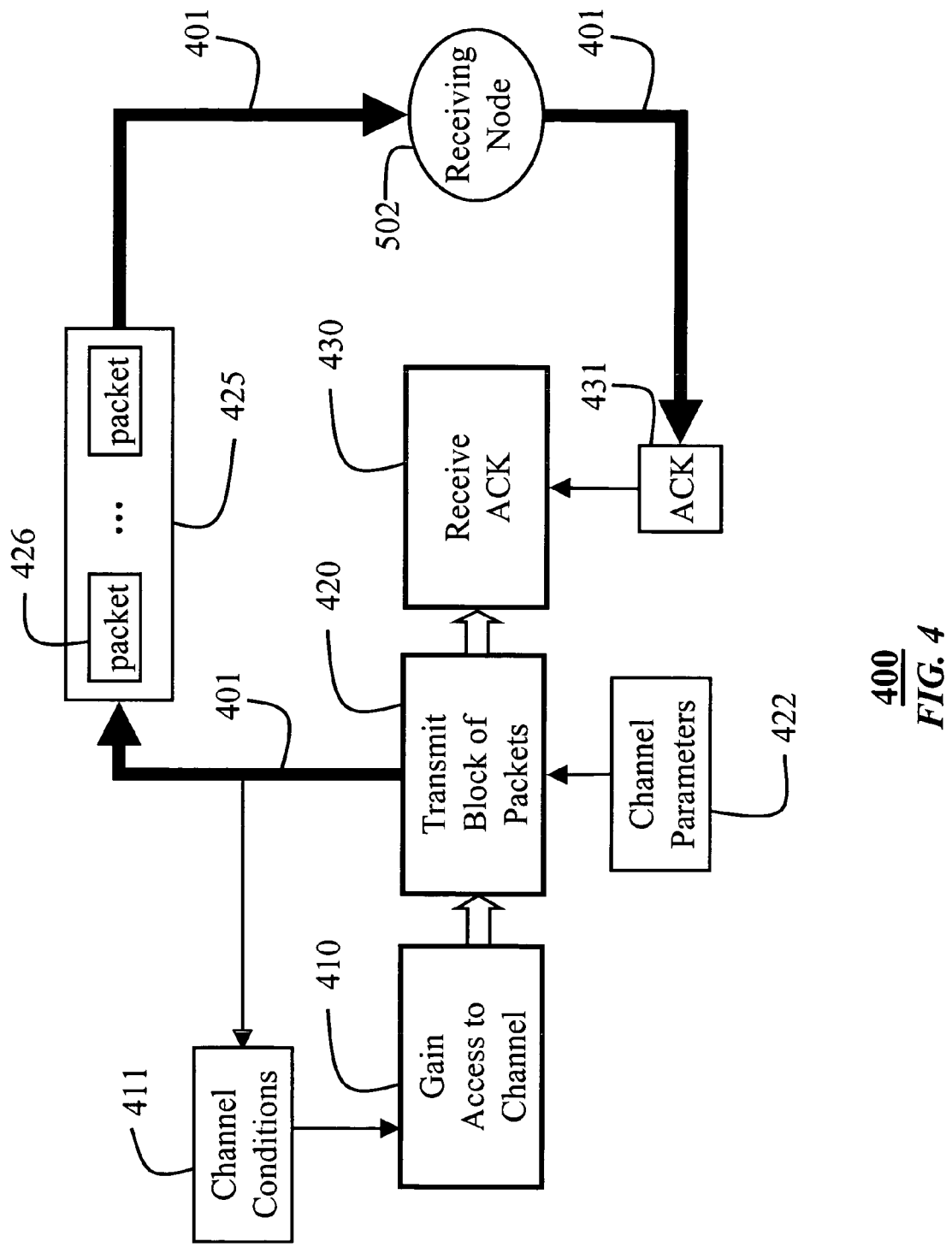
FIG. 4 is a block diagram of a method according to the invention.

As shown in FIG. 4, the invention provides an adaptive distributed channel access (ADCA) method 400 for nodes in a packet switched, wireless communications networks 500. Every node in the network contends for the channel 401 using a modified CSMA/CA to gain access 410 to a single channel. Access can be gained according to channel conditions 411.

After gaining access 410, the method 400 uses adaptive batch transmission of packets, and opportunistically selects transmission rates of the nodes to improve overall channel efficiency in the long term.

Instead of transmitting a single packet from one node to another node after a successful RTS/CTS exchange as in the prior art, the ADCA method 400 according to the invention allows a node to transmit 420 a block 425 of packets 426 to a receiving node 502 via the channel 401. In response, a single acknowledgement packet (ACK) 431 is received 430 for the entire block 425 of packets 426 via the channel 401. The ACK packet can indicate that the entire block of packets were received correctly, or that some or all of the packets need to be retransmitted.

The ADCA method also preferentially selects nodes with high transmission rates and good channel conditions 411, in terms of SNR, to gain access to the channel over nodes with low transmission rates and bad channel conditions.

For high-rate nodes, the ADCA method achieves throughput proportional fairness in that such nodes transmit data in proportion to their current transmission rates as specified by channel parameters 422.

For low-rate nodes, the ADCA method achieves weighted fairness in throughput. This way, each node receives a predetermined minimum fair share, while increasing overall channel utilization by opportunistically selecting nodes with higher transmission rates at any time.

The operation of the method according to the invention uses a novel credit/debit mechanism. In addition, the ADCA method achieves service differentiation via differential back-offs for nodes in multiple access categories. The ADCA method also handles packets with variable sizes and variable transmission rates, as specified by the channel parameters.

Overview of ADCA Method

Our ADCA MAC protocol uses a combination of adaptive batch transmission packets and opportunistic transmission to both reduce MAC overhead and improve overall channel throughput. The ADCA method can also use variable packet sizes and multiple transmission rates to provide service differentiation for different applications. The method also provides an adaptive fair sharing scheme for contending nodes.

The ADCA method maximizes channel throughput by reducing MAC overhead and opportunistically selecting nodes during channel contention. The overhead is reduced by adaptive batch transmission of a block of packets and using the single acknowledgment packet for the block of packets.

Opportunistic channel throughput gain is achieved by preferentially selecting nodes with better channel conditions 411, in terms of SNR. Service differentiation is achieved by using differential backoff values for different access categories (ACs), each AC offering delivery at a predetermined priority.

Channel Parameter Element

Figure 1:
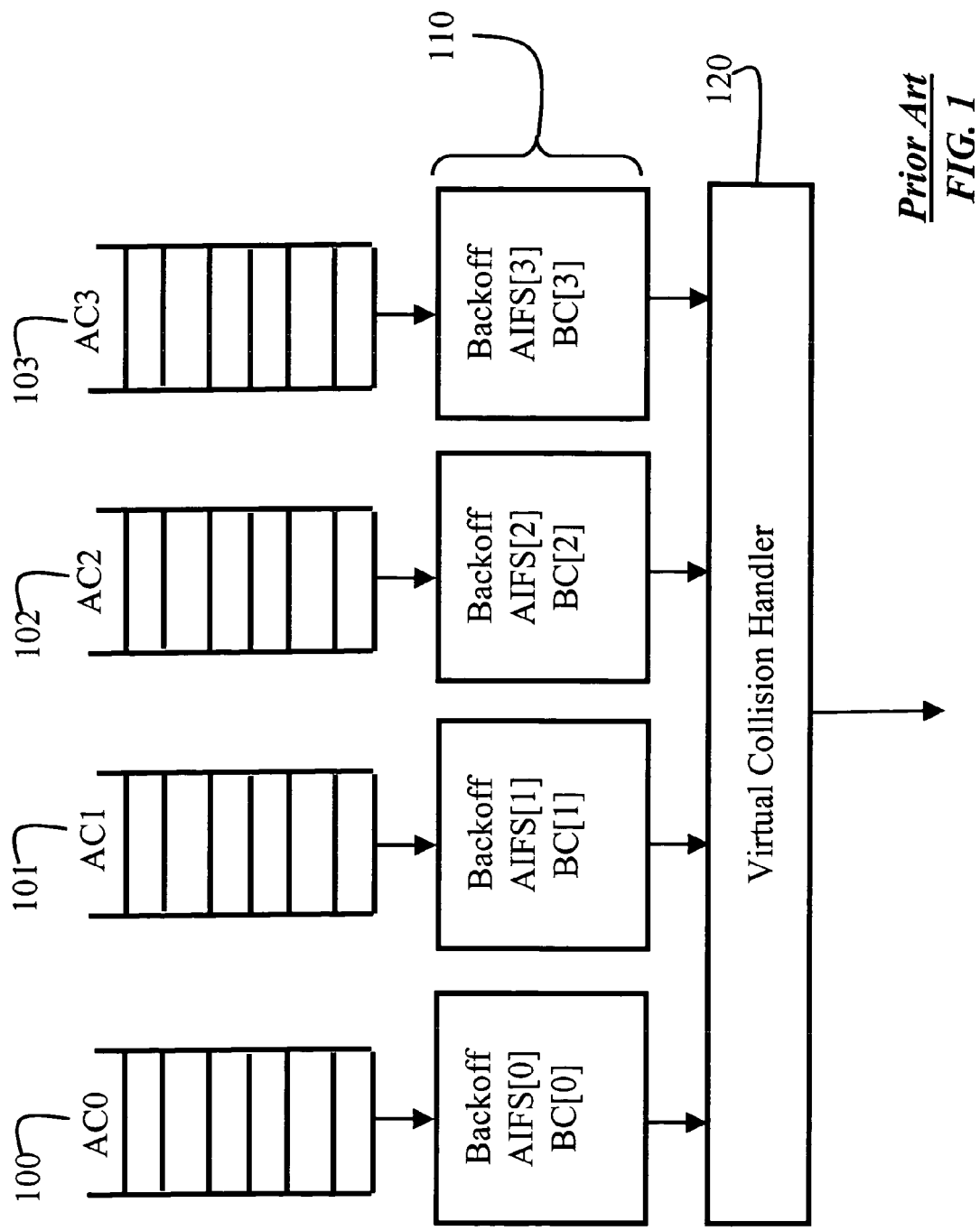
FIG. 1 is a block diagram of prior art access categories.
Figure 2:
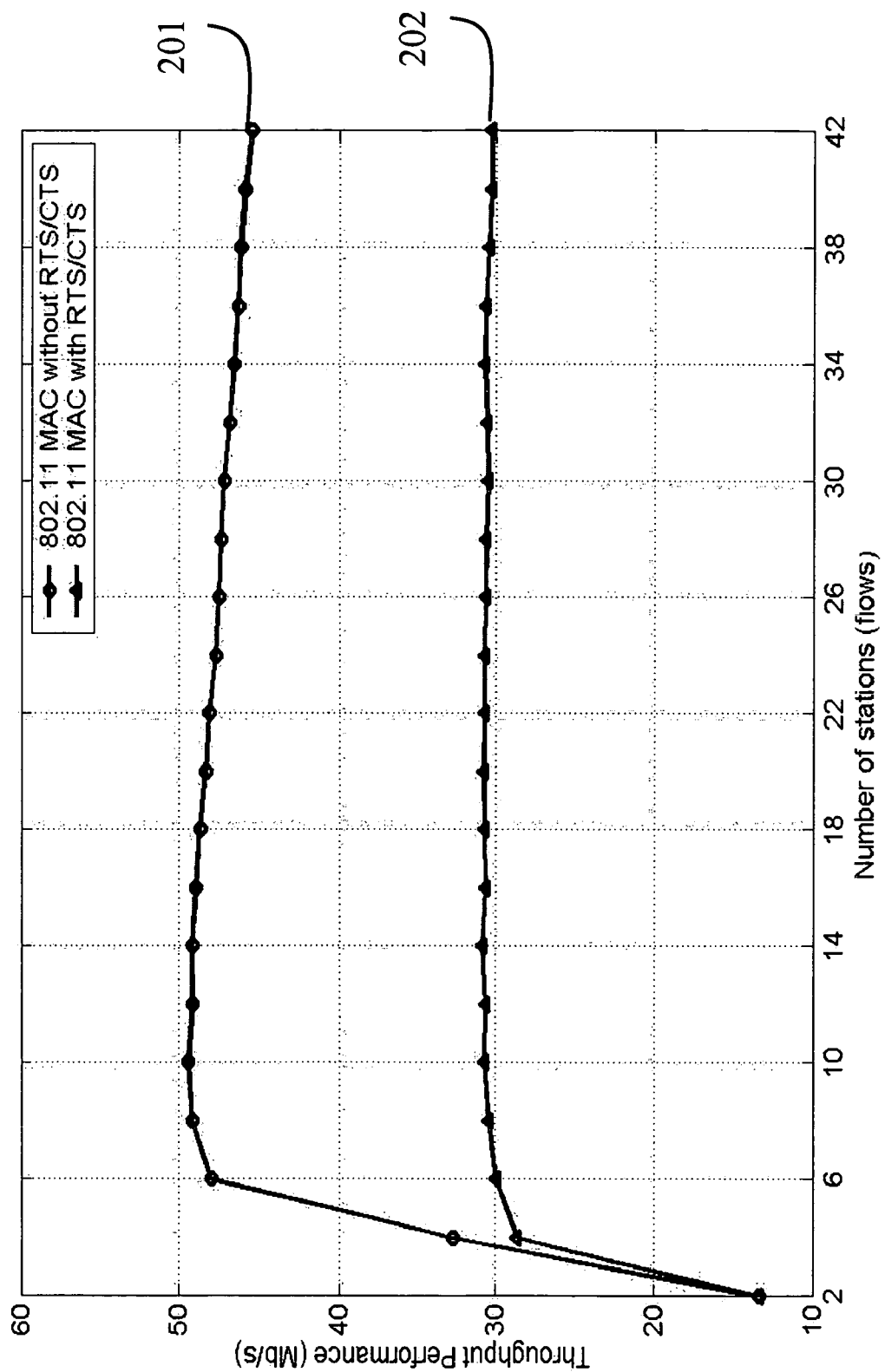
FIG. 2 is a graph comparing prior art channel throughput with and without RTS/CTS.
Figure 3:
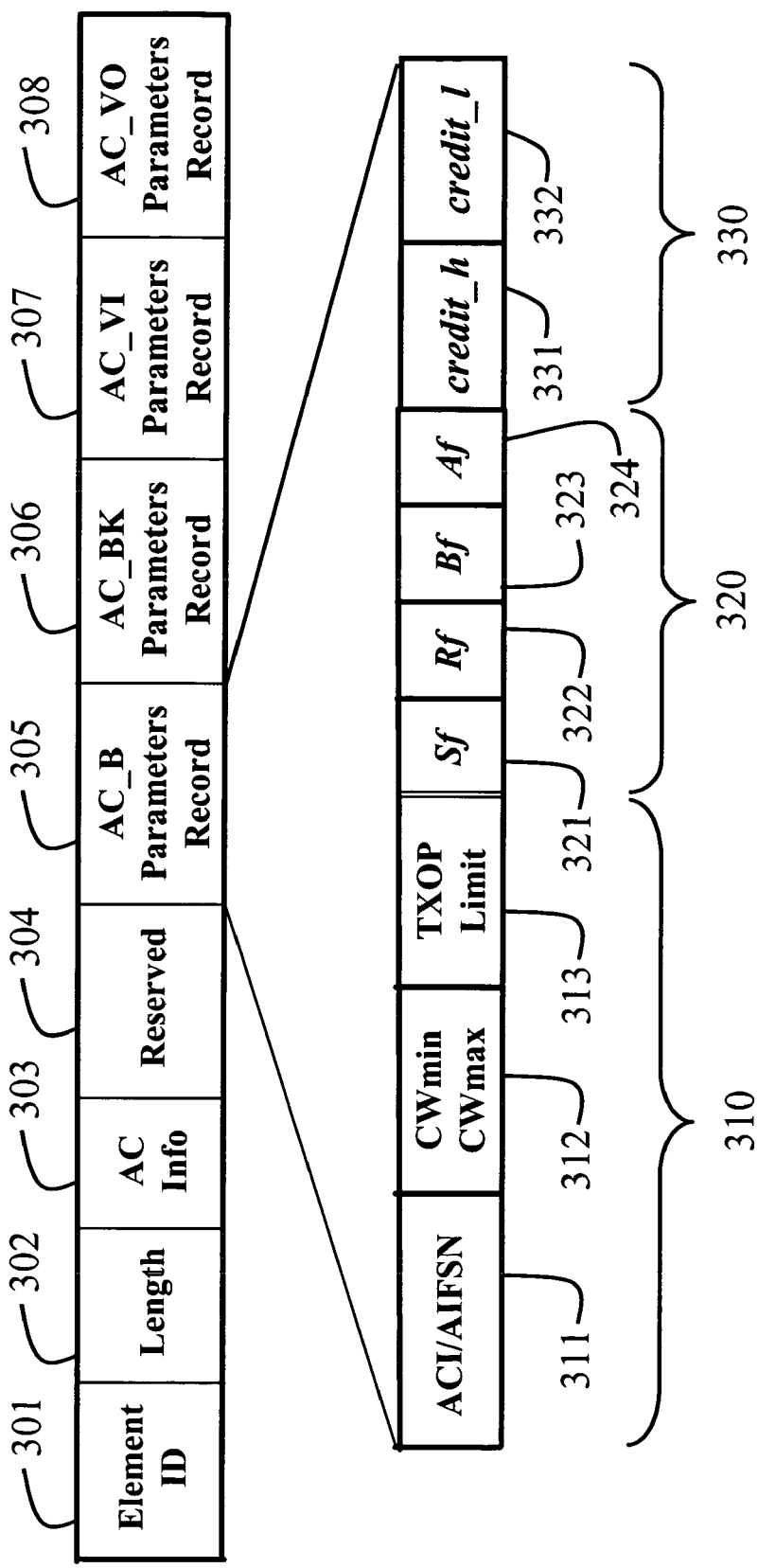
FIG. 3 is a channel parameter element according to the invention.

FIG. 3 shows a channel parameter element 300 according to the invention. The channel parameter element can be part of the beacon frame that is broadcast periodically. The parameters shown in 300 include the following fields: element ID 301, element length 302, AC information 303, RESERVED 304, and four AC fields 305-308; these are conventional. The element ID is for indicating a type of parameter set, the element length specified the length of this element frame, and the AC information keeps track of parameter change times.

In addition, each AC field further includes an AC parameter set 310 and a reference parameter set (RPS) 320. Each AC parameter set 310 includes the following fields: ACI/AIFSN 311, CWmin and CWmax 312, and TXOP limit 313. The ACI/AIFSN is the AIFS setting for a given AC, the CWmin and CWmax fields define the contention window size, and TXOP specifies a maximum duration of channel access time.

The RPS set 320 includes the following fields: a packet size Sf 321, transmission rate Rf 322, a block size Bf 323, and an acknowledgement Af 324.

The parameters in the fields 321-324 of the RPS set 320 can be maintained and adjusted dynamically by the AP according to channel conditions and be broadcast periodically as part of the beacon.

The element 300 also includes a credit counter set (CCS) 330 for each AC to regulate channel access within CSMA/CA. The CCS 330 includes the fields: credit_h 331 and credit_l 332. The CCS 330 is maintained by each node in a distributed manner.

When a node gains access 410 to the channel, the node transmits the block 425 of Bf packets 426. The single acknowledgment packet (ACK) 431 is used for the entire block of packets.

The number Bf of packets 426 in the block 425 depend the channel conditions 411 and the channel parameters 422, e.g., the current transmission rate Rf, and the size Sf of the packets.

The ADCA method opportunistically provides higher access probability for high-rate nodes that have good channel conditions, as indicated by the SNR, but ensures a minimum fair share for low-rate nodes in channel access.

The ADCA has several appealing features. It improves MAC throughput significantly by reducing overhead induced by contention backoff, optional RTS/CTS exchange, DFS interframe space, and a single ACK after transmitting a block of packets.

The method dynamically leverages channel quality of each node by opportunistically favoring high-rate nodes to maximize aggregate channel throughput. The method retains temporal fairness among high-rate nodes and provides low-rate nodes access in proportion to their current transmission rate.

The RPS set 320 is managed by the AP 502, provides flexible control for channel access among contending nodes according to their current channel conditions, and enables scalable performance by limiting the number of contending nodes at any given time.

Channel contention posed by low-rate stations can be proportionally restrained, while preserving an adaptive time fairness for the low-rate nodes. The method 400 can be used with the IEEE 802.11 standard with minor changes, and the method is backward compatible with the legacy 802.11 and 802.11e standards.

Protocol Operations

The pseudo code for the ADCA method according to the invention is given in the Appendix.

ADCA Design in Detail

Adaptive Batch Transmission and Block Acknowledgment

The ADCA method allows for multiple back-to-back packet transmissions to reduce the overhead of the protocol. To achieve this goal, the AP broadcasts three parameters, the Rf, Sf, and Bf, to each node. These three channel parameters state that a node can transmit a block of Bf consecutive packets, at a rate Rf, and each of the packets including Sf bytes.

During each batch transmission for a given node, the block of Bf consecutive packets are separated only by a smallest time interval called short inter-frame space (SIFS). This is in sharp contrast to the legacy 802.11 MAC, in which two consecutive packet transmissions are separated by the time of DIFS, plus random contention backoff and possibly the optional RTS/CTS exchange. This way, our block transmission significantly reduces overhead of the MAC.

The choice of the parameter Bf 323 depends on average channel conditions perceived by nodes in the network.

The above batch transmission is adaptive to the current transmission rate of the transmitting node. When a node is not operating at the reference rate Rf, the batch size is adjusted in proportion to its current transmission rate.

In order to further reduce the MAC overhead, we also use a block acknowledgement packet (ACK) via the parameter Af 324, which is negotiated between two nodes according to perceived channel conditions. In ADCA, the single ACK packet 431 is sent back to the sender by the receiving node for a block of back-to-back transmitted packets, instead of on a per-packet ACK in the current 802.11 MAC.

If some packets in the block are received incorrectly, the sender node retransmits only the incorrect packets as indicated by block ACK packet, instead of the entire block. This can be indicated by a bit string, with zero bits indicating failure, and one bits indicating success for the corresponding packets in the block. Alternatively, packet serial numbers can be used. This further reduces the protocol overhead of the current MAC.

The above design balances between maximizing overall channel throughput, by providing high-rate nodes with channel conditions with higher access probability, and providing a minimum fair share for low-rate nodes.

Therefore, the method provides a minimum fair share to each node and additionally maximizes channel throughput. The provided fairness for a contending node is as follows.

For high-rate nodes, we provide temporal fairness in terms of identical channel access time, which is similar to legacy MAC in single rate network. Equivalently, this implies proportional throughput fairness, in that the throughput is proportional to the current transmission rate R of the node.

For low-rate nodes, each node is provided proportional temporal fairness in that its access time is substantially proportional to its current transmit rate squared. Its throughput, accordingly, is in fair proportion to its rate.

Opportunistic Selecting of High-Rate Nodes

The ADCA method 400 preferentially allows nodes that have better channel conditions 411 to gain access, while restraining access to nodes that have bad channel conditions, as measured, e.g., by a SNR in the channel.

Specifically, for high-rate nodes with rates R>=Rf, the ADCA allows the nodes to gain access to the channel immediately after they 'win' channel contention, as long as they can transmit a batch of Bf or more packets.

If a high-rate node cannot form a batch 425 of Bf packets 426 for transmission, the node resumes channel contention but retains a channel time credit via its credit counter credit_h 331. When the accumulated credit is sufficient for a batch of Bf packets, the node can transmit the block immediately after gaining access to the channel.

For low-rate nodes with rates R<Rf, we defer channel access and control their probability to gain access, only allowing the low-rate nodes to contend for the channel approximately every Rf=R interval. This is realized by the credit counter credit_l 332. This credit counter is incremented each time the low-rate node gains access to the channel during channel contention.

However, the node does not transmit any packets. When the accumulated credit_l 331 reaches Rf=R, and again gains access to the channel, the low-rate node can transmit a batch of Bf packets, each of which has a size Sf.

At the same time, we still keep credit_h for the low-rate nodes in case the nodes get channel time compensation as soon as they perceive good channel conditions during this process. The above design balances between maximizing overall channel throughput by providing high-rate nodes currently in good conditions with higher access probability, and providing minimum share for the channel to avoid completely blocking the low-rate nodes.

Therefore, our method provides a minimum fair share to each node and additionally maximizes channel throughput. The provided fairness for a contending node is as follows.

For high-rate nodes, we provide temporal fairness in terms of identical channel access time, which similar to legacy MAC in single rate. Equivalently, this implies proportional throughput fairness in that the throughput is proportional to the current transmission rate R. For low-rate nodes, each node is provided proportional temporal fairness in that the access time is roughly to the current transmit rate squared. The throughput, accordingly, is in substantially proportional to the rate squared.

In the above design, we also handle the issue of variable packet size. When the packet size is different from Sf, the batch size and the credit counters are reset according to S=Sf. This is also obvious from the pseudo code.

Service Differentiation

Our ADCA method also achieves service differentiation through differential backoffs in multiple service categories. The method prioritizes data in the packets with different QoS requirements in terms of throughput and latency via multiple access categories (ACs). Each AC has a separate backoff value. A relatively high priority AC has smaller backoff values, whereas a lower-priority AC has larger backoff values. This way, packets with higher-priority ACs always have preference over gaining channel access than lower-priority ACs. This mechanism is similar to EDCA in IEEE 802.11e.

Implementation

In this section, we describe how our ADCA method is implemented within the CSMA/CA framework. The implementation leverages the current EDCA mode of IEEE 802.11e MAC, with minor modifications.

RPS Distribution and CCS

In ADCA, each AC has its own RPS settings that can be adjusted depending on a current performance of the network and channel conditions 421. The AP manages each RPS. The RPS configuration is included in the periodic beacon frame, broadcast to each node.

FIG. 3 shows the EDCA parameter set element 300 in the beacon frame, which adjusts the parameters for the ACs and the fields that contain the values of these parameters. AC parameter records in 802.11e include field for AIFS, CWmin, CWmax and TXOP for a given AC. We extend the AC parameter record format to include fields for parameters in RPS.

By adding the RPS to each AC parameter record, the AP can adjust these parameters dynamically. When a node joins the network, the node first listens for the beacon, and then extracts the parameter set RPS and configures the parameters accordingly.

The two credit counters credit_h and credit_l in CCS can be implemented as integer array for all ACs. Each node maintains this parameter set to accumulate the channel access time when it is not sufficient for a batch transmission. The credit counters also keep the residue time left by current transmissions.

Channel Rate Adaptation

Rate adaptation adjusts dynamically a physical-layer transmission rate to match the current channel condition. The goal is to select a highest possible rate that matches the current channel SNR. To use ADCA, each node needs to fetch this physical-layer data rate into the MAC layer. Then, the node can exploit this rate information to decide whether it is eligible to gain channel access.

The physical-layer data rate information is obtained from the current frame, e.g., the 802.11a OFDM frame header. Two aspects of rate adaptation are important for ADCA operations. An inaccuracy in channel estimation affects rate selection. This can further lead to performance degradation in ADCA, due to erroneous batch size setting and channel access. However, ADCA works with any rate adaptation mechanism, e.g., auto rate fallback (ARF) and receiver based auto rate (RBAR), see Borst et al., "Dynamic rate control algorithms for HDR throughput optimization," Proceedings of IEEE INFOCOM '01, April 2001, and Holland et al., "A rate-adaptive MAC protocol for multi-hop wireless networks," Proceedings of ACM MOBICOM '01, 2001.

In ARF, the sending node selects the best rate based on the information from previous data packet transmissions, incrementally increasing and decreasing the rate after a number of consecutive successes or failures. RBAR utilizes the RTS/CTS exchange to allow the receiver to select the appropriate rate for data packets. This way, better channel estimation is provided for batch transmissions in ADCA. Moreover, the parameter Af can also be adjusted according to the current channel condition obtained via the RTS/CTS exchange.

Indeed, RTS/CTS can improve the system performance by offering the latest information on the channel conditions 421 at each node. The ADCA enables RTS/CRS for this purpose.

Extending to Ad-Hoc Mode

So far, the ADCA method has been described for the infrastructure mode. In infrastructure mode, the AP provides a certain degree of central coordination among nodes, but the channel access is fully distributed following the CSMA/CA paradigm. The design is consistent with the current 802.11 DCF.

The ADCA method can also be adapted for the ad hoc mode. In the ad hoc mode, the RTS/CTS exchange is enabled. Each transmitting node maintains a list of its one-hop, active receiving nodes with which the transmitting node can perform data communications. For the active nodes, packets are transmitted when the RPS is received. These parameters are selected according to channel estimation using the RTS/CTS exchange. Each active neighboring node records the parameters settings and updates the parameters according to the current channel conditions.

Handling Misbehaving Nodes

The ADCA can also handle non-compliant nodes to some extent. A non-compliant node is one that gains a greater channel share than it is entitled to. We can mitigate these non-compliant nodes by monitoring and policing these nodes via the AP. The AP tracks the channel share that each node has actually received and determines the fair share based on the transmission rate of the node and other RPS settings. When the AP detects a non-compliant node with an access time beyond a predetermined threshold, the AP revokes temporarily the right for the non-compliant node to gain access right to the channel. This can be realized via the "de-authentication" mechanism provided by the current 802.11 MAC management agent.

Security and Power Saving

The ADCA can work in concert with all the current security mechanisms of 802.11 MAC. Moreover, it also works well in the power saving mode of the current specification.

EFFECT OF THE INVENTION

The invention provides a method that works in concert with a high-capacity physical layer in a wireless network. The method minimizes overhead via adaptive batch transmission and block ACK packets. Each node transmits a block of multiple back-to-back packets after it succeeds in gaining access to the channel. The receiving node only needs to send back a single ACK packet upon receiving the block of multiple packets. The ADCA also allows high-rate nodes, i.e., nodes with a transmission rate that is higher than Rf, gain channel access with a higher probability, while limiting the access probability of low-rate nodes that are subject to bad channel conditions.

The method ensures temporal fair share of the channel among high-rate nodes, and provides fair access to low-rate nodes in proportion to their current transmission rates. As a result, each node receives a minimum share of the channel, while the overall channel throughput is improved. In addition, the method also achieves service differentiation via differential backoffs for various access categories.

Simulations show that the method according to the invention can achieve up to a 128% gain in throughput, while reducing an average delay by about 54%, compared with the legacy 802.11 MAC.

With a physical-layer transmission rate at 216 Mb/s, the method can offer 106 Mb/s MAC-layer throughput with RTS/CTS turned on, in contrast to a mere 35 Mb/s by the prior art 802.11 MAC.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

APPENDIX

When a node joins the network:
1 Initiate values for Sf, Rf, Bf and Af according to a received beacon, and
2 credit_h=0;
3 credit_l=0;

When packets are ready to be transmitted after gaining access to the channel:

```
1    /* R, S are data rate and packet size */
2    if R ≥ Rf
3        /* maintain temporal fairness among high-rate nodes */
4        int B = ((Sf/Rf)*Bf + credit_h)/(S/R);
5        if B < Bf
6            credit_h += (Sf/Rf)*Bf;
7            credit_l += 1;
8            resume to backoff procedure;
9        else
10           Transmit for ((Sf/Rf)*Bf + credit_h) time
11           credit_h = 0;
12           credit_l = 0;
13   else /* for low-rate stations R < Rf */
14       /* keep proportional fairness for them, fair share in
         proportional to their rates */
15       if credit_l < (Rf/R)
16           credit_l += 1;
17           credit_h += (Sf/Rf)*Bf;
18           resume to backoff procedure;
19       else
20           Transmit for ((Sf/Rf)*Bf) time
21           credit_h = 0;
22           credit_l = 0;
```

We claim:

1. A method for transmitting packets over a channel in a wireless communication network including a plurality of nodes, comprising:
   gaining access, in a transmitting node, to the channel;
   transmitting a block of packets to a receiving node via the channel; and
   receiving, in the transmitting node, a single acknowledgement packet from the receiving node in response to transmitting the block of packets;
   transmitting periodically a beacon flame, the beacon flame including a plurality of access category fields, and each access category field further including an access category parameter set and a reference parameter set.

2. The method of claim 1, in which the access is gained according to conditions of the channel.

3. The method of claim 1, in which the conditions include a signal to noise ratio.

4. The method of claim 1, in which the acknowledgement packet indicates incorrect packets received by the receiving node, and further comprising:
   retransmitting the incorrect packets.

5. The method of claim 1, in which the reference parameter set includes a packet size field, a transmission rate field, a block size field, and an acknowlegement field.

6. The method of claim 5, in which the reference parameter set includes a credit counter set, the credit counter set including a credit_h field and a credit_l field.

7. The method of claim 1, in which the packets in the block are separated by a short inter-frame space.

8. The method of claim 1, in which a number of packets in the block depends on conditions of the channel.

9. The method of claim 1, in which a number of packets in the block depends on a current transmission rate of the transmitting node.

10. The method of claim 1, in which an amount of access time to the channel by the transmitting node is substantially proportional to a current transmission rate of the transmitting node.

11. The method of claim 1, in which the access is gained according to a priority of data in the packets.

12. The method of claim 1, in which a rate of transmitting the block of packets depends on conditions of the channel.

13. The method of claim 1, further comprising:
estimating conditions of the channel with a request-to-send/clear-to-send exchange RTS-CTS exchange.

14. A wireless communication network including a plurality of nodes, comprising:
 a transmitting node configured to gain access to the channel and to transmit a block of packets via the channel after gaining access; and
 a receiving node configured to receive the block of packets and to transmit a single acknowledgement packet to the transmitting node in response to receiving the block of packets.

* * * * *